United States Patent
Chandrashekar

(10) Patent No.: US 12,511,425 B2
(45) Date of Patent: Dec. 30, 2025

(54) SECURE DATABASE ENVIRONMENT WITH THIRD-PARTY VERIFICATION

(71) Applicant: Snowflake Inc., Bozeman, MT (US)

(72) Inventor: Samartha Chandrashekar, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 123 days.

(21) Appl. No.: 18/530,936

(22) Filed: Dec. 6, 2023

(65) Prior Publication Data

US 2025/0190612 A1 Jun. 12, 2025

(51) Int. Cl.
*G06F 21/62* (2013.01)
*G06F 21/57* (2013.01)

(52) U.S. Cl.
CPC .......... *G06F 21/6227* (2013.01); *G06F 21/57* (2013.01)

(58) Field of Classification Search
CPC ...................................................... G06F 21/57
See application file for complete search history.

(56) References Cited

U.S. PATENT DOCUMENTS

| | | | |
|---|---|---|---|
| 9,667,416 B1 * | 5/2017 | Machani | H04L 9/3215 |
| 10,338,957 B2 * | 7/2019 | Scarlata | H04L 9/0861 |
| 11,489,678 B2 * | 11/2022 | Scarlata | G09C 1/00 |
| 12,067,119 B1 * | 8/2024 | Brandwine | G06F 9/45558 |
| 2014/0052999 A1 * | 2/2014 | Aissi | G06F 21/64 |
| | | | 713/189 |
| 2014/0095867 A1 * | 4/2014 | Smith | H04L 63/0861 |
| | | | 713/164 |
| 2016/0085916 A1 * | 3/2016 | Smith | G16H 50/70 |
| | | | 705/3 |
| 2016/0182499 A1 * | 6/2016 | Sharaga | G06F 21/82 |
| | | | 713/156 |
| 2018/0019986 A1 * | 1/2018 | Manohar | H04W 12/06 |
| 2019/0116038 A1 * | 4/2019 | Sprague | H04L 9/3226 |
| 2019/0362083 A1 * | 11/2019 | Ortiz | H04L 9/3247 |
| 2020/0342092 A1 * | 10/2020 | Wei | G06F 21/6218 |
| 2021/0157682 A1 * | 5/2021 | Antonopoulos | G06F 16/2379 |
| 2023/0004671 A1 * | 1/2023 | Buchan | H04L 9/088 |
| 2024/0022550 A1 * | 1/2024 | Raghuram | H04L 63/062 |
| 2024/0152641 A1 * | 5/2024 | Mehta | H04L 9/08 |
| 2024/0380595 A1 * | 11/2024 | Moyer | H04L 63/10 |
| 2025/0124155 A1 * | 4/2025 | Wang | G06F 21/602 |

* cited by examiner

*Primary Examiner* — Hieu T Hoang
(74) *Attorney, Agent, or Firm* — Schwegman Lundberg & Woessner, P.A.

(57) ABSTRACT

Systems and methods are provided for creating a secure database execution environment. The system generates, by a database system executing on a secure enclave, attestation information. The system transmits the attestation information to a remote entity. The system obtains, by the database system executing on the secure enclave, one or more encryption keys in response to the remote entity authenticating the attestation information. The system performs, by the database system executing on the secure enclave, one or more database operations on encrypted data stored on the database system using the one or more encryption keys.

29 Claims, 7 Drawing Sheets

SECURE DATABASE ENVIRONMENT WITH THIRD-PARTY VERIFICATION

TECHNICAL FIELD

Examples of the disclosure relate generally to data platforms and databases and, more specifically, to providing a secure database execution environment.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The accuracy and efficiency at which various operations can be performed is impacted by the schema associated with various rows/columns of the tables.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
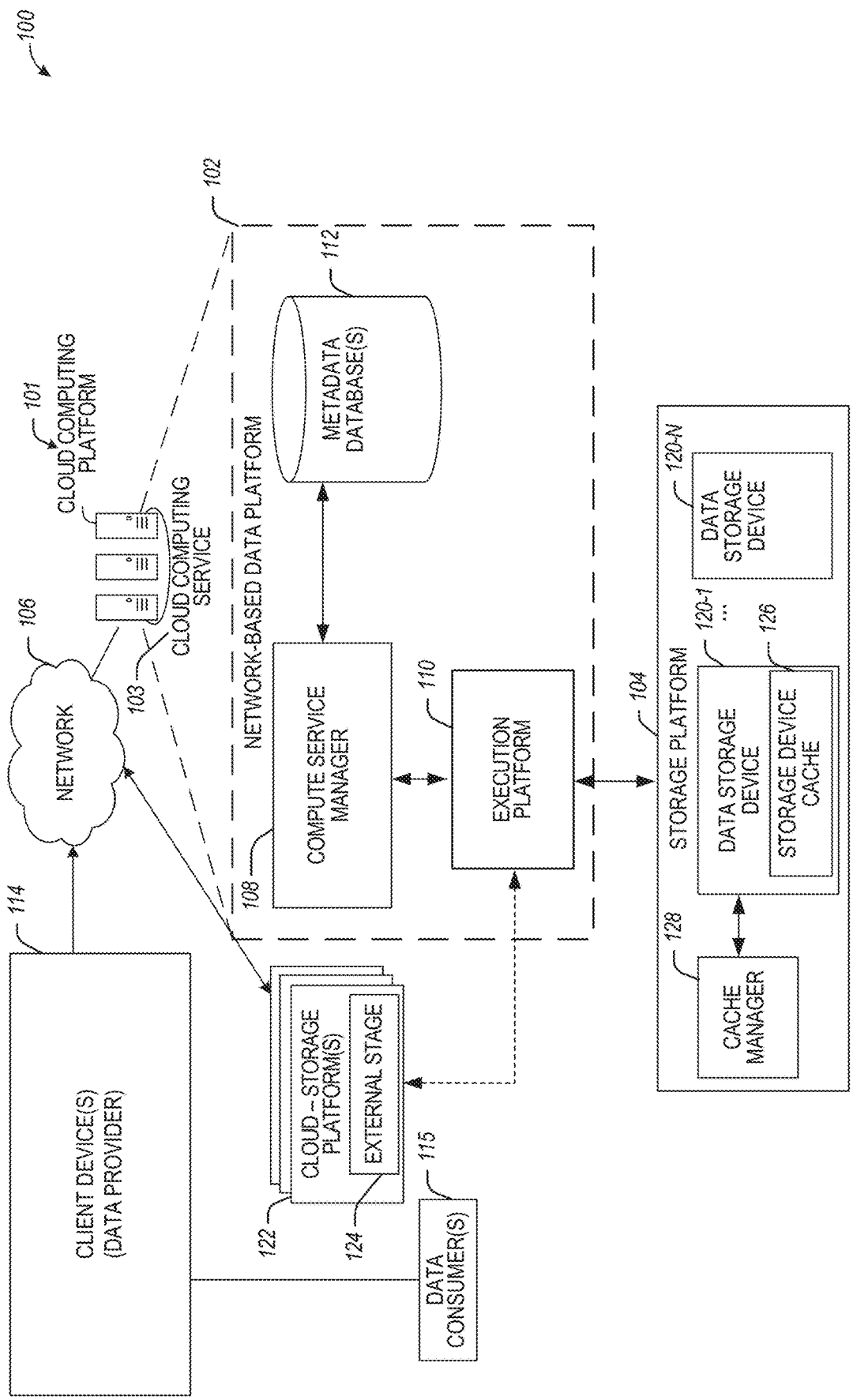
FIG. 1 illustrates an example computing environment that includes a network-based data platform, in accordance with some examples of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts (e.g., entities), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. The entities that are allocated services on the data platform may be third-parties relative to an entity that provides or hosts the data platform.

Users and/or executing processes that are associated with a given customer account may, via one or more types of clients, be able to cause data to be ingested into the database, and may also be able to manipulate the data, add additional data, remove data, run queries against the data, generate views of the data, and so forth. In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows or a collection of rows) that each include one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein. As referred to herein, a "record" is defined as a collection of data (e.g., textual data) in a file that is organized by one or more fields, where each field can include one or more respective data portions (e.g., textual data, such as strings). Each field in the record can correspond to a row or column of data in a table that represents the records in the file. It should be understood that the terms "row" and "column" are used for illustration purposes and these terms are interchangeable. Data arranged in a column of a table can similarly be arranged in a row of the table.

Conventional database systems offer the ability for customers to run certain tasks in a secure manner. These systems can use secure execution environments to perform such tasks. However, the control and operation of these database systems still remain entirely within the providers of the database systems. Customers are afforded minimal visibility as to the internal operations of the database systems and cannot independently verify that the database systems operate using security protocols that the customers need. Certain customers need to verify the secure operations of the database systems and grant access independently and remotely to their data. However, conventional database systems fail to provide access to their security protocols and management. This provides minimal flexibility to the customers and increases the risk of security breaches. In order to enhance the security and provide end-to-end protection, there is a need to release encryption keys through a trusted execution environment (TEE) that hosts the workload.

In order to address these shortcomings, the disclosed techniques provide a secure database system that allows customers to use their own key to encrypt data in use, data at rest and data in transit. The disclosed techniques use hardware protections to secure the key and to protect the data in use across every component of the database systems. The disclosed techniques provide a mechanism to allow customers to independently attest that the data in use is encrypted using confidential compute primitives.

In some examples, the disclosed techniques provide virtual warehouses that include one or more clusters of virtual machines (VMs) in a networked mesh. To realize confidential warehouses, each VM in the virtual warehouse as well as the affiliated metadata database clusters runs confidential VMs in a secure enclave, such as a TEE. The VMs perform the following operations: 1) encryption for "data in use" including CPU and memory state; 2) attestation mechanisms to verify the full health and security level either using TEE primitives or virtual Trusted Platform Module (TPM); 3) the root of trust for attestation is based in silicon; and 4) secure boot for the operating system (OS). Many options are provided for creating the confidential compute systems and warehouses including enclave-based approaches that use a secure enclave, hardware solutions where applications are refactored and use isolated compute environments, and various others. In general, these secure compute environments are referred to as secure enclaves.

In some examples, the disclosed techniques generate, by a database system executing on a secure enclave, attestation information. The disclosed techniques transmit the attestation information to a remote entity (e.g., a third-party service or third-party server). The disclosed techniques obtain, by the database system executing on the secure enclave, one or more encryption keys in response to the remote entity authenticating the attestation information. The disclosed techniques perform, by the database system executing on the secure enclave, one or more database operations on encrypted data stored on the database system using the one or more encryption keys. By performing these operations, the data platform increases security and trust in utilization of execution node processing capability and avoids waste and inefficient use of resources.

FIG. 1 illustrates an example computing environment 100 that includes a data platform in the example form of a network-based data platform 102, in accordance with some examples of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other examples, the computing environment may comprise another type of network-based database system or a cloud data platform. For example, in some aspects, the computing environment 100 may include a cloud computing platform 101 with the network-based data platform 102, and a storage platform 104 (also referred to as a cloud storage platform). The cloud computing platform 101 provides computing resources and storage resources that may be acquired (purchased) or leased and configured to execute applications and store data. In some cases, a portion of the cloud computing platform 101 can be implemented by one or more secure enclaves, such as a TEE.

A TEE is a secure area of a main processor. A TEE helps code and data loaded inside it to be protected with respect to confidentiality and integrity. Data integrity prevents unauthorized entities from outside the TEE from altering data, while code integrity prevents code in the TEE from being replaced or modified by unauthorized entities, which may also be the computer owner itself. This is done by implementing unique, immutable, and confidential architectural security such as Intel Software Guard Extensions (INTEL SGX) which offers hardware-based memory encryption that isolates specific application code and data in memory. Intel SGX allows user-level code to allocate private regions of memory, called enclaves, which are designed to be protected from processes running at higher privilege levels. A TEE as an isolated execution environment provides security features such as isolated execution, integrity of applications executing with the TEE, along with confidentiality of their assets. In general terms, the TEE offers an execution space that provides a higher level of security for trusted applications running on the device than a rich operating system (OS) and more functionality than a secure element (SE).

The cloud computing platform 101 may host a cloud computing service 103 that facilitates storage of data on the cloud computing platform 101 (e.g., data management and access) and analysis functions (e.g., structured query language (SQL) queries, analysis), as well as other processing capabilities (e.g., parallel execution of sub-plans as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (e.g., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform. The techniques described in this disclosure pertain to non-volatile storage devices that are used for the internal storage location and/or the external storage location.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—e.g., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., Amazon Web Services (AWS)®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts. The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user (entity) of one of the multiple client accounts (multiple entity accounts) supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices that may be used to access services provided by the cloud computing platform 101 (e.g., cloud computing service 103) by way of a network 106, such as the Internet or a private network.

In the description below, actions are ascribed to users, particularly consumers, entities, and providers. Such actions shall be understood to be performed concerning client device (or devices) 114 operated by such users (also referred to as entities). For example, notification to a user may be understood to be a notification transmitted to client device 114, input or instruction from a user may be understood to be received by way of the client device 114, and interaction with an interface by a user shall be understood to be an interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some examples, a user account object lists users authorized to access at least one target account (e.g., an account of a data provider or data consumer 115). In some examples, a roles account object configures privileges for the users to access the at least one target account. In some aspects, a warehouse object indicates compute resources (e.g., at least one virtual warehouse of the execution platform 110) for executing a workload associated with one or more databases of the data provider. In some examples, a resource monitor object configures monitoring usage of the compute resources.

The compute service manager 108 is also coupled to one or more metadata databases 112 that store metadata about various functions and aspects associated with the network-based data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
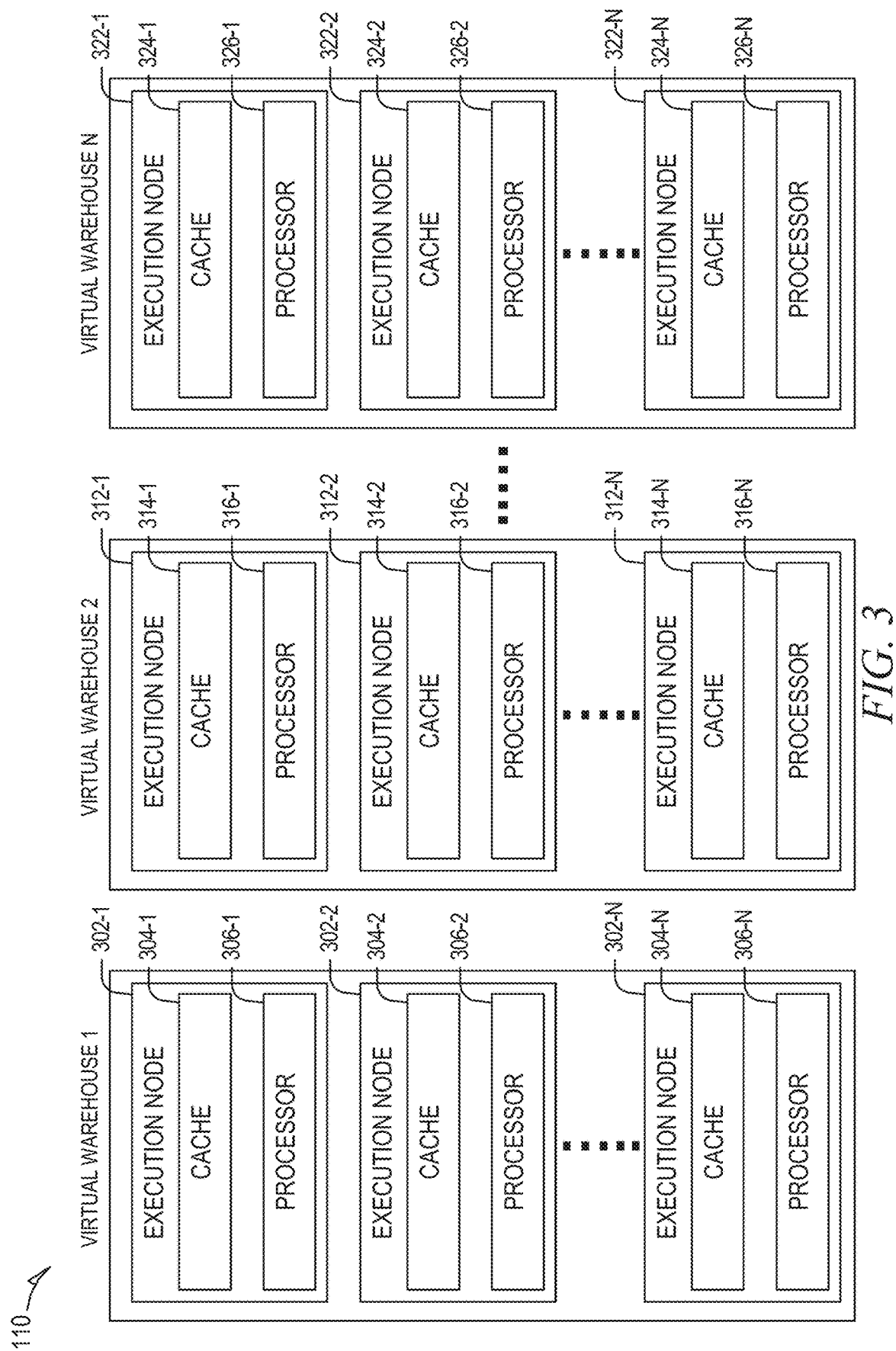
FIG. 3 is a block diagram illustrating components of an execution platform, in accordance with some examples of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some examples, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. Some or all of the portions of the execution platform 110 can be executed by one or more secure enclaves, such as one or more TEEs.

In some examples, at least one storage device cache 126 (e.g., an internal cache) may reside on one or more of the data storage devices 120-1-120-N, and at least one external stage 124 may reside on one or more of the cloud storage platforms 122. In some examples, a single storage device cache 126 can be associated with all of the data storage devices 120-1-120-N so that the single storage device cache 126 is shared by and can store data associated with any one of the data storage devices 120-1-120-N. In some examples, each data storage device 120-1-120-N can include or implement a separate storage device cache 126. A cache manager 128 handles the transfer of data from the data storage devices 120-1-120-N to the storage device cache 126. The cache manager 128 handles the eviction of data from the storage device cache 126 to the respective associated data storage devices 120-1-120-N. The storage platform 104 can include one or more hard drives and/or can represent a plurality of hard drives distributed on a plurality of servers in a cloud computing environment.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, the compute service manager 108, metadata database(s) 112, execution platform 110, and storage platform 104 can be scaled up or down (independently of one another) depending on changes to the requests received and the changing needs of the network-based data platform 102. Thus, in the described examples, the network-based data platform 102 is dynamic and supports regular changes to meet the current data processing needs.

During a typical operation, the network-based data platform 102 processes multiple jobs (e.g., operators of sub-plans) determined by the compute service manager 108. These jobs (e.g., caller processes) are scheduled and managed by the compute service manager 108 to determine when and how to execute the job. For example, the compute service manager 108 may divide the job into multiple discrete tasks (e.g., caller processes) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task (e.g., in a storage device cache 126, such as an HDD cache or RAM) and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various examples, the execution platform 110 executes a query according to a query plan determined by the compute service manager 108. As part of executing the query, the execution platform performs a table scan in which one or more portions of a database table are scanned to identify data that matches the query. More specifically, the database table can be organized into a set of files where each file comprises a set of blocks (or records) and each block (or record) stores at least a portion of a column (or row) of the database. Each execution node provides multiple threads of execution, and in performing a table scan, multiple threads perform a parallel scan of the set of blocks (or records) of a file, which may be selected from a scan set corresponding to a subset of the set of files into which the database is organized.

The cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
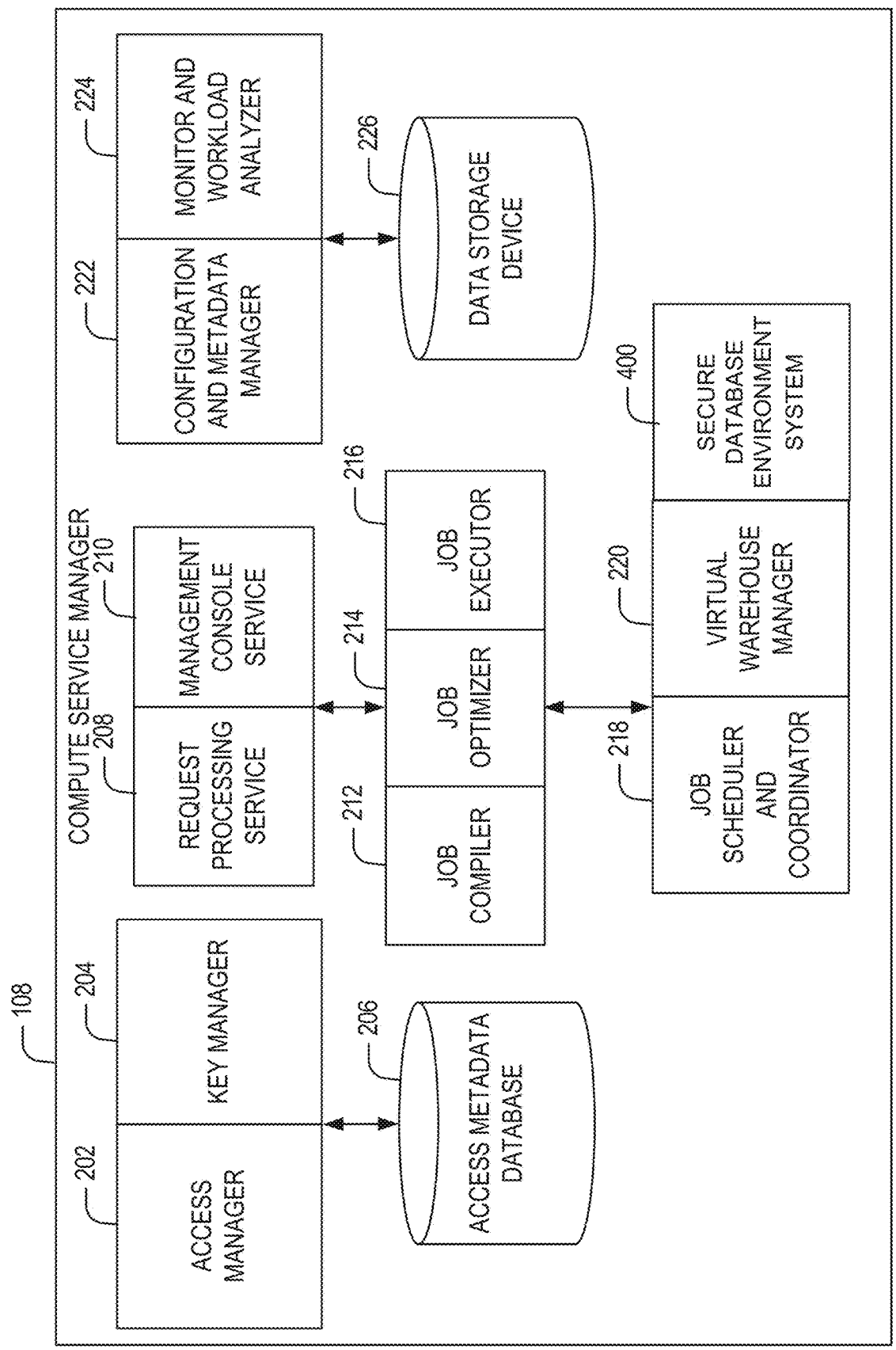
FIG. 2 is a block diagram illustrating components of a compute service manager, in accordance with some examples of the present disclosure.

FIG. 2 is a block diagram illustrating components of the compute service manager 108, in accordance with some examples of the present disclosure. As shown in FIG. 2, the compute service manager 108 includes an access manager 202 and a credential management system (or key manager) 204 coupled to an access metadata database 206, which is an example of the metadata database(s) 112, and a secure database environment system 400. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices," "non-volatile storage devices," "cloud storage devices," or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110, in a storage device cache 126, or in a data storage device in storage platform 104 of FIG. 1.

A management console service 210 supports access to various systems and processes by administrators and other system managers. Additionally, the management console service 210 may receive a request to execute a job and monitor the workload on the system. The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an example, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries by one or more execution nodes of the execution platform 110.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, in accordance with some examples of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. In some examples, one or more of the virtual warehouses can be executed by a secure enclave, such as a TEE. In such cases, the virtual warehouses are confidential virtual warehouses.

The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing data from any of the data storage devices 120-1 to 120-N and their associated storage device cache 126 (e.g., via a respective lock file) shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some examples, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306~ 2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data. In cases where the virtual warehouses are confidential virtual warehouses, the execution nodes of the confidential virtual warehouses can be implemented by a secure enclave, such as a TEE.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some examples, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state. Each virtual warehouse can separately and independently host processes and allocate resources across multiple user accounts or multiple entities. In this way, each virtual warehouse can implement a multi-tenant data platform. In some cases, a first virtual warehouse can be associated with a first likelihood of service disruption while a second virtual warehouse can be associated with a second likelihood of service disruption. Certain user accounts to which resources of the first virtual warehouse are allocated can be notified about service disruptions if the first likelihood transgresses a specified threshold. Certain user accounts to which resources of the second virtual warehouse are allocated can be notified about service disruptions if the second likelihood transgresses the same or different specified threshold.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the cloud storage platform 104. The techniques described with respect to the cache manager 128 of the storage platform 104 (e.g., an HDD) can be similarly applied to the cache 304-N, 314-N, and 324-N of the execution nodes 302-N, 312-N, and 322-N.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, virtual warehouses 1-N may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
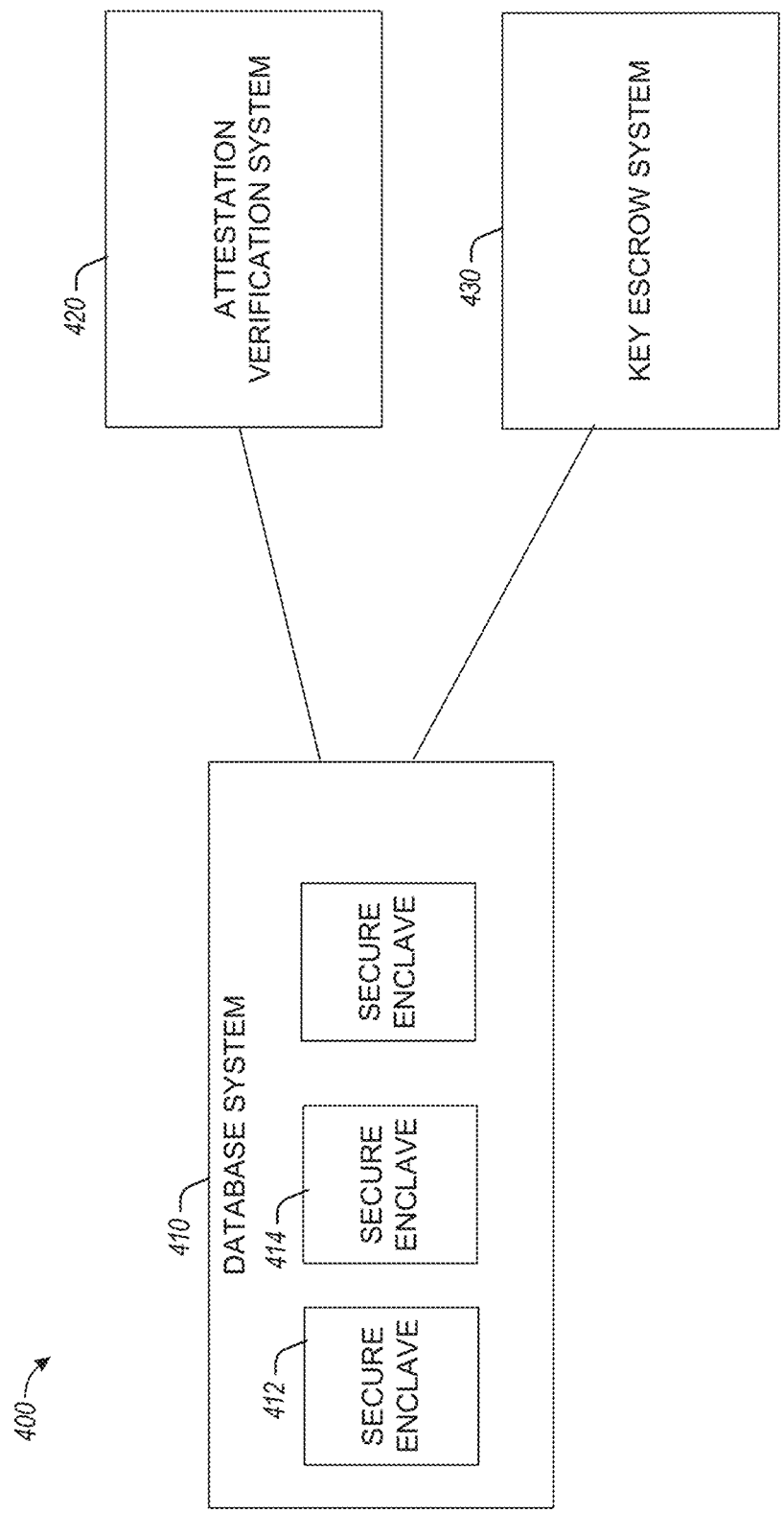
FIG. 4 is a block diagram of a secure database environment system, in accordance with some examples of the present disclosure.

FIG. 4 is a block diagram illustrating an example of the secure database environment system 400 which can be implemented by any of the virtual warehouses of the execution platform 110 (and/or by the compute service manager 108), in accordance with some examples of the present disclosure. The secure database environment system 400 can be implemented by one or more confidential virtual warehouses, such as a confidential virtual warehouse implemented by the execution node 302-1 (e.g., a secure enclave).

In such cases, the operating system of the confidential virtual warehouse can be provided by one or more client devices 114. The operating system can be a secure operating system which is inaccessible to any entity outside of the virtual warehouse on which the operating system is being executed. The code for the operating system itself can be encrypted. In some cases, the operating system executing on the confidential virtual warehouse can be implemented by open source code. This allows any entity outside or external to the provider of the confidential virtual warehouse to review and verify the authenticity of the code executing on the confidential virtual warehouse.

In some examples, the source code for the binary file executing or running the confidential virtual warehouse by the various secure enclaves 412 and 414 can be made accessible to and shared with the one or more client devices 114 (e.g., the customer). This allows the customer to verify that the operating system of the confidential virtual warehouse is functioning in the manner expected by the customer. In some cases, the customer can independently build or program the source code for the confidential virtual warehouse operating system. The customer can compile the source code and provide a binary file from the one or more client devices 114 to the confidential virtual warehouse. The confidential virtual warehouse can then execute this binary file to implement the functions of the operating system defined by the customer. The one or more client devices 114 can transmit a request for a hash of the binary file currently running or executing on the various secure enclaves 412 and 414. The various secure enclaves 412 and 414 can provide the binary file itself or a hash of the binary file to the one or more client devices 114. The one or more client devices 114 can then compare the binary file that is provided or the hash of the binary file to one or more expected values (e.g., an expected binary file or hash) to verify that the binary file running on the various secure enclaves 412 and 414 is exactly what is being claimed to be running by the provider of the confidential virtual warehouse.

Specifically, a database system 410 can be implemented by various secure enclaves 412 and 414. The secure enclave 412 can include some or all portions of a first confidential virtual warehouse (e.g., virtual warehouse 1 of FIG. 3) and the secure enclave 414 can include some or all portions of a second confidential virtual warehouse (e.g., virtual warehouse 2 of FIG. 3). In some cases, the operating system that implements the database system 410 can be provided by a specific user via the client device 114 of the user (e.g., client account). The database system 410 represents a portion of the execution platform 110 (FIGS. 1 and 2).

In some cases, the client device 114 may use the database system 410 to perform one or more database operations securely and confidentially. In such cases, the client device 114 of the user sends to the client device 114 encrypted data. The encrypted data can be stored by one or more components of the database system 410 in encrypted form. In order to perform the operations on the data, the database system 410 may need to obtain one or more decryption keys.

To do so, the operating system of the various secure enclaves 412 and/or various secure enclaves 414 can generate attestation information. Specifically, the various secure enclaves 412 can instruct the local processor or execution node to retrieve code and execute code to generate the attestation information. In some cases, the local processor then generates a data log by accessing information stored in the local memory of the processor and various other hardware resources, such as a clock. The local processor then encrypts the data log (e.g., hardware resource logs) to generate the attestation information. In some examples, the attestation information is generated by keys derived from a hardware root of the various secure enclaves 412 or various secure enclaves 414 and represents that a secure enclave is being used and is in a known good state.

The database system 410 transmits the attestation information to the attestation verification system 420. The attestation verification system 420 can be implemented by a third-party service or third-party server relative to the provider of the database system 410. The attestation verification system 420 can be a trusted entity of the user of the client device 114. The attestation verification system 420 authenticates the attestation information. To do so, the attestation verification system 420 accesses one or more authorization policies. The authorization policies specify an expected value for the attestation information and include a decryption key for the attestation information. The attestation verification system 420 decrypts the attestation information received from the database system 410 and verifies whether the decrypted attestation information matches the expected value. If so, the attestation verification system 420 successfully authenticates the attestation information.

The attestation verification system 420 can transmit a token or certificate back to the database system 410 in response to successfully authenticating the attestation information. The database system 410 can then transmit a request for the one or more keys to the key broker or key escrow system 430. The request can include the token or certificate. The key escrow system 430 can be a third-party device or third-party server relative to the provider of the attestation verification system 420 and/or the provider of the database system 410.

The key escrow system 430 can verify authenticity of the token or certificate and use that token or certificate to retrieve one or more decryption keys from storage. In some cases, the client device 114 of the user provides the decryption keys to the key escrow system 430 securely and stores the decryption keys on the key escrow system 430, such as using the certificate. The key escrow system 430 can transmit the one or more decryption keys securely back to the database system 410. The database system 410 can then use the one or more decryption keys to decrypt the data stored by the database system 410, such as by one or more of the various secure enclaves 412 or the various secure enclaves 414 and to perform database operations on the decrypted data.

Figure 5:
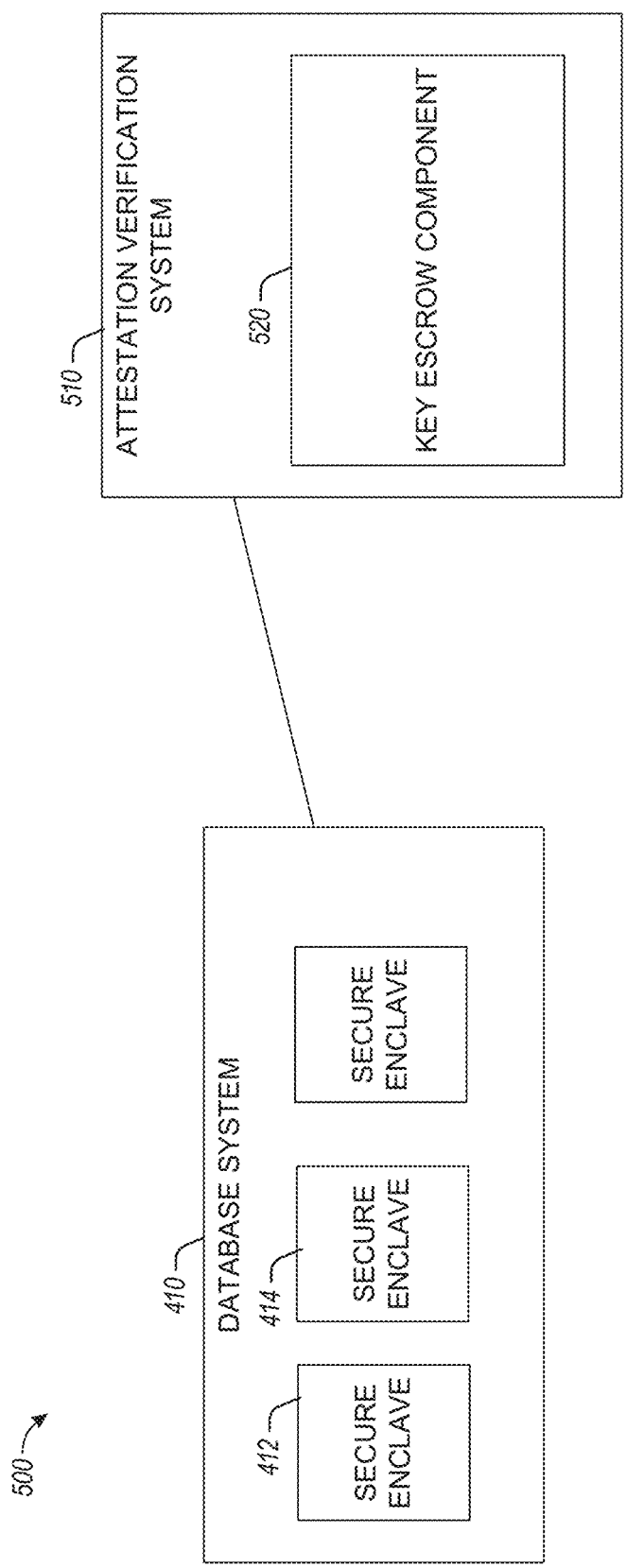
FIG. 5 is a block diagram of a secure database environment system, in accordance with some examples of the present disclosure.

In some examples, the attestation verification system 420 implements or performs operations for verifying the authenticity of the attestation information and management and delivery of the one or more decryption keys. For example, FIG. 5 is a block diagram illustrating an example of the secure database environment system 500 which can be implemented by any of the virtual warehouses of the execution platform 110 (and/or by the compute service manager 108), in accordance with some examples of the present disclosure. The secure database environment system 500 can be implemented by one or more confidential virtual warehouses, such as a confidential virtual warehouse implemented by the execution node 302-1 (e.g., a secure enclave).

In such cases, the operating system of the confidential virtual warehouse can be provided by one or more client devices 114. The operating system can be a secure operating system which is inaccessible to any entity outside of the virtual warehouse on which the operating system is being executed. The code for the operating system itself can be encrypted. In some cases, the operating system executing on the confidential virtual warehouse can be implemented by open source code. This allows any entity outside or external to the provider of the confidential virtual warehouse to review and verify the authenticity of the code executing on the confidential virtual warehouse. Certain components of the secure database environment system 500 are similar to those of secure database environment system 400 and are similarly labeled.

Specifically, the database system 410 of FIG. 5 can be implemented by various secure enclaves 412 and 414. The secure enclave 412 can include some or all portions of a first confidential virtual warehouse (e.g., virtual warehouse 1 of FIG. 3) and the secure enclave 414 can include some or all portions of a second confidential virtual warehouse (e.g., virtual warehouse 2 of FIG. 3). In some cases, the operating system that implements the database system 410 can be provided by a specific user via the client device 114 of the user (e.g., client account).

In some examples, the operating system of the various secure enclaves 412 and/or various secure enclaves 414 can generate attestation information. Specifically, the various secure enclaves 412 can instruct the local processor or execution node to retrieve code and execute code to generate the attestation information. In some cases, the local processor then generates a data log by accessing information stored in the local memory of the processor and various other hardware resources, such as a clock. The local processor then encrypts the data log (e.g., hardware resource logs) to generate the attestation information. In some examples, the attestation information is generated by keys derived from a hardware root of the various secure enclaves 412 or various secure enclaves 414 and represents that a secure enclave is being used and is in a known good state.

The database system 410 transmits the attestation information to the attestation verification system 510. The attestation verification system 510 can be implemented by a third-party service or third-party server relative to the provider of the database system 410. The attestation verification system 510 can be a trusted entity of the user of the client device 114. The attestation verification system 510 authenticates the attestation information. To do so, the attestation verification system 510 accesses one or more authorization policies. The authorization policies specify an expected value for the attestation information and include a decryption key for the attestation information. The attestation verification system 510 decrypts the attestation information received from the database system 410 and verifies whether the decrypted attestation information matches the expected value. If so, the attestation verification system 510 successfully authenticates the attestation information.

The attestation verification system 420 can access one or more keys from the key escrow component 520. The key escrow component 520 can securely store the decryption keys of a client device 114. The key escrow component 520 can transmit the one or more decryption keys securely back to the database system 410 in response to the database system 410 providing the attestation information that was successfully authenticated by the database system 410. The database system 410 can then use the one or more decryption keys to decrypt the data stored by the database system 410, such as by one or more of the various secure enclaves 412 or the various secure enclaves 414 and to perform database operations on the decrypted data.

In some examples, the client device 114 may need to verify that the operating system of the database system 410 is an expected operating system. In such cases, the client device 114 can instruct the database system 410 to generate a hash of the code of the operating system of the various secure enclaves 412 and/or the various secure enclaves 414. The database system 410 can provide the hash of the code back to the client device 114. The client device 114 can verify whether the hash of the code matches an expected hash value, such as by generating independently a hash of the operating system code previously provided by the client device 114 to the execution platform 110. The client device 114 can determine that the hash value match and in response successfully confirms that the operating system of the database system 410 has not been modified or tampered with.

Figure 6:
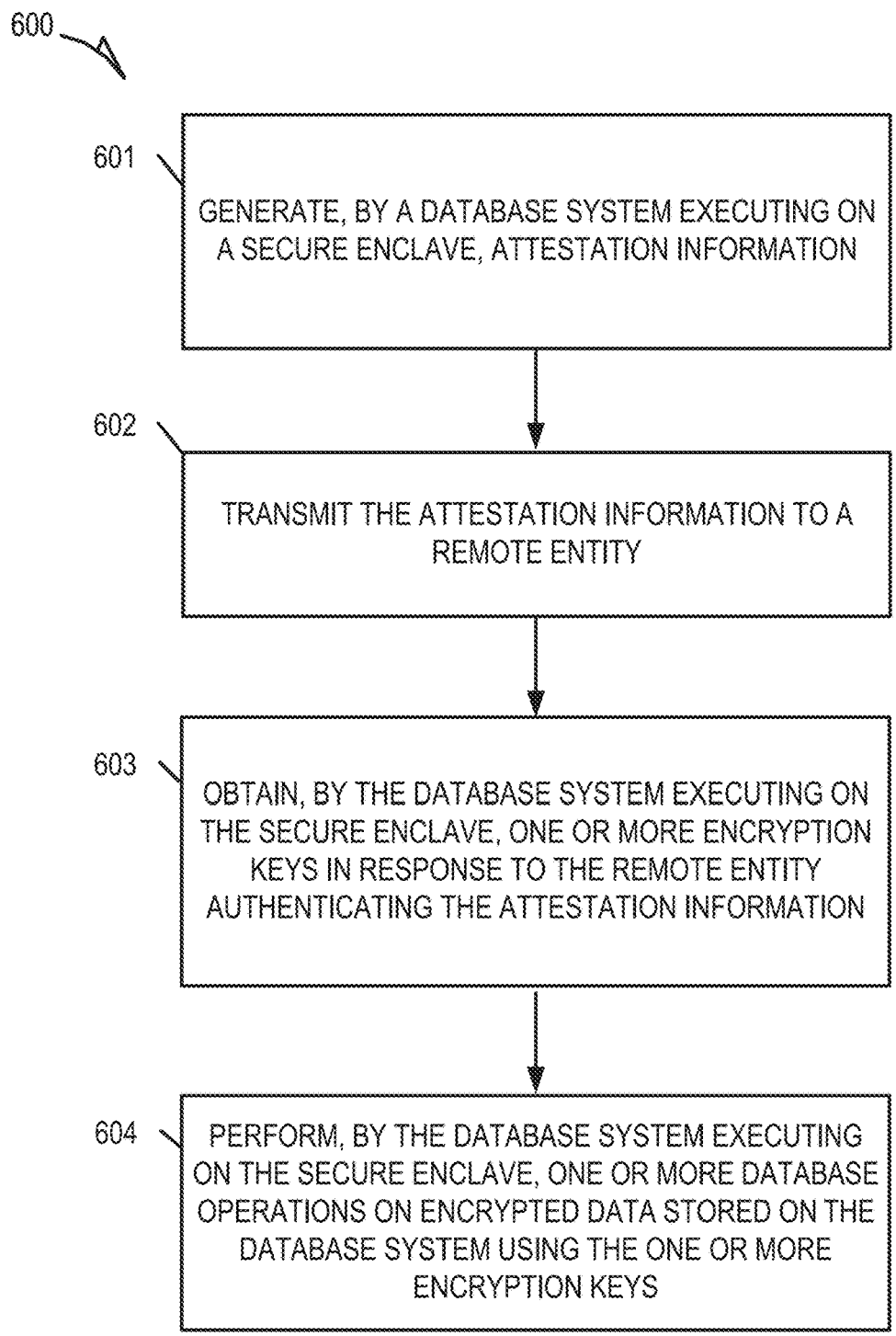
FIG. 6 is a flow diagram illustrating operations of the secure database environment system, in accordance with some examples of the present disclosure.

FIG. 6 is a flow diagram illustrating operations 600 of the secure database environment system 400, in accordance with some examples of the present disclosure. The operations 600 may be embodied in computer-readable instructions for execution by one or more hardware components (e.g., one or more processors) such that the operations of the operations 600 may be performed by components of data platform 102 such as the execution platform 110. Accordingly, the operations 600 is described below, by way of example with reference thereto. However, it shall be appreciated that operations 600 may be deployed on various other hardware configurations and is not intended to be limited to deployment within the data platform 102. Depending on the example, an operation of the operations 600 may be repeated in different ways or involve intervening operations not shown. Though the operations of the operations 600 may be depicted and described in a certain order, the order in which the operations are performed may vary among examples, including performing certain operations in parallel or performing sets of operations in separate processes.

At operation 601, the secure database environment system 400 generates, by a database system executing on a secure enclave, attestation information, as discussed above.

At operation 602, the secure database environment system 400 transmits the attestation information to a remote entity, as discussed above.

At operation 603, the secure database environment system 400 obtains, by the database system executing on the secure enclave, one or more encryption keys in response to the remote entity authenticating the attestation information, as discussed above.

At operation 604, the secure database environment system 400 performs, by the database system executing on the secure enclave, one or more database operations on encrypted data stored on the database system using the one or more encryption keys, as discussed above.

Described implementations of the subject matter can include one or more features, alone or in combination as illustrated below by way of example.

Example 1: A system comprising: at least one hardware processor; and at least one memory storing instructions that cause the at least one hardware processor to execute operations comprising: generating, by a database system executing on a secure enclave, attestation information; transmitting the attestation information to a remote entity; obtaining, by the database system executing on the secure enclave, one or more encryption keys in response to the remote entity authenticating the attestation information; and performing, by the database system executing on the secure enclave, one or more database operations on encrypted data stored on the database system using the one or more encryption keys.

Example 2. The system of Example 1, wherein the database system comprises a virtual warehouse.

Example 3. The system of any one of Examples 1-2, wherein the attestation information is generated by keys derived from a hardware root and represents that a secure enclave is being used and is in a known good state.

Example 4. The system of any one of Examples 1-3, the operations comprising: accessing one or more resource logs associated with the secure enclave; obtaining a key associated with the secure enclave; encrypting the one or more resource logs using the obtained key to generate the attestation information.

Example 5. The system of any one of Examples 1-4, wherein the remote entity comprises a third-party service relative to an entity that provides the database system.

Example 6. The system of Example 5, wherein the remote entity accesses one or more authorization policies and authenticates the attestation information using the one or more authorization policies.

Example 7. The system of any one of Examples 1-6, the operations comprising: receiving, from the remote entity, a token in response to the remote entity authenticating the attestation information; transmitting a request for the one or more keys to a key broker, the request comprising the token; and receiving the one or more keys from the key broker in response to the key broker successfully authenticating the token.

Example 8. The system of any one of Examples 1-7, wherein the remote entity stores the one or more keys and provides the one or more keys to the database system in response to authenticating the attestation information.

Example 9. The system of any one of Examples 1-8, wherein processes executed by the secure enclave are inaccessible to any resource external to the secure enclave.

Example 10. The system of any one of Examples 1-9, wherein an operating system of the secure enclave executing the database system is open source.

Example 11. The system of any one of Examples 1-10, wherein an operating system of the secure enclave executing the database system is provided by a user of the database system, the user being associated with the encrypted data.

Example 12. The system of any one of Examples 1-11, wherein the user is associated with a client device that generates the one or more keys and provides the one or more keys to the remote entity or a key broker associated with the remote entity.

Example 13. The system of any one of Examples 1-12, the operations comprising: generating a hash of an operating system being executed by the secure enclave; and transmitting the hash to a client device of a user to enable the client device to authenticate the operating system being executed by the secure enclave.

Example 14. The system of any one of Examples 1-13, wherein the secure enclave comprises a trusted execution environment (TEE).

Figure 7:
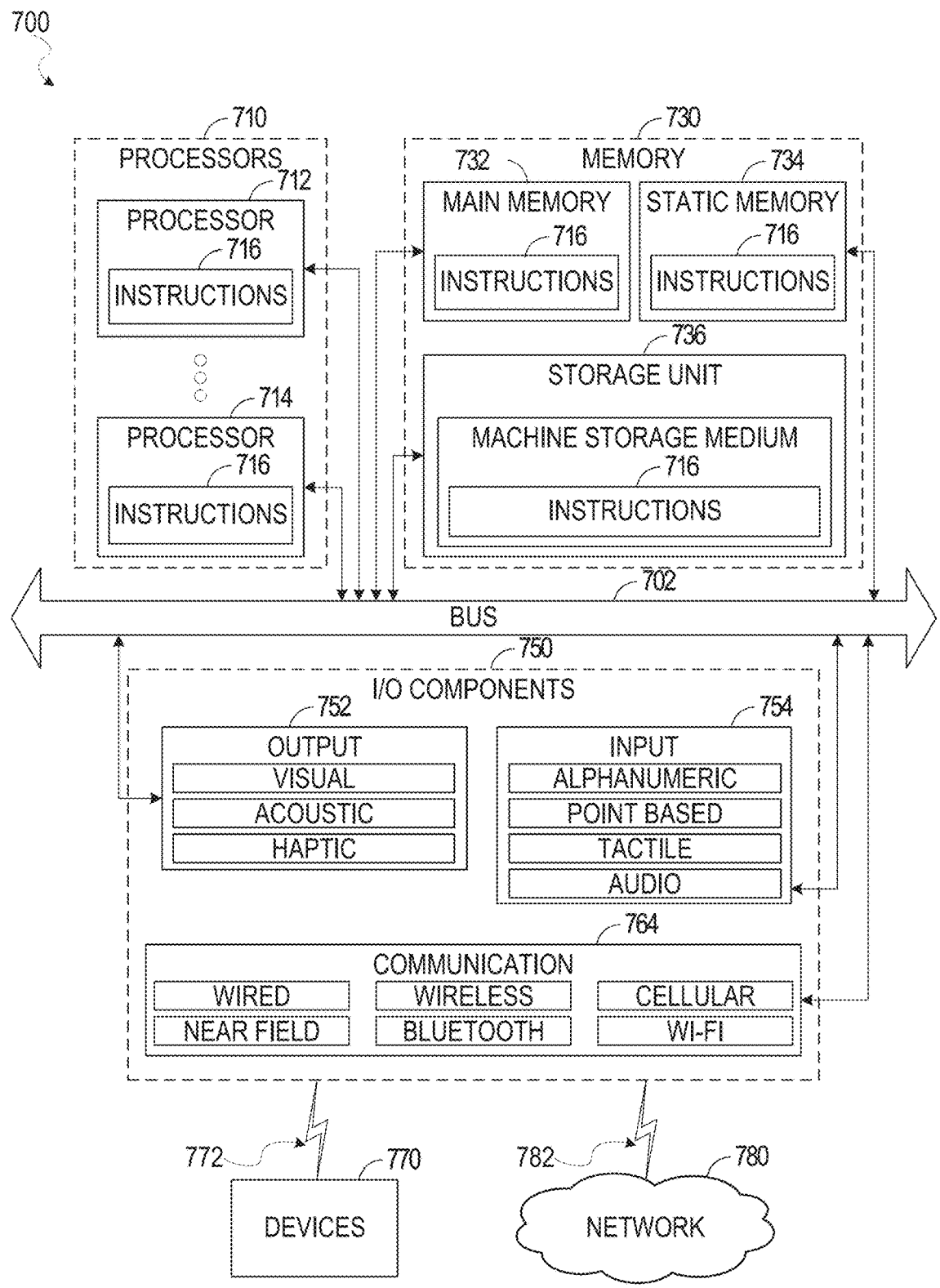
FIG. 7 illustrates a diagrammatic representation of a machine in the form of a computer system within which a set of instructions may be executed for causing the machine to perform any one or more of the methodologies discussed herein, in accordance with some examples of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of the above processes (e.g., operations 600). In this way, the instructions 716 transform a general, non-programmed machine into a particular machine 700 (e.g., the compute service manager 108 or one or more execution nodes of the execution platform 110) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service managers 108, the execution platform 110, and the devices 770 may include any other computing device described herein as being in communication with the data platform 102.

The various memories (e.g., 730, 732, 734, and/or memory of the processors 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the process or operations 600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A database system comprising:
   at least one hardware processor; and
   at least one memory storing instructions that cause the at least one hardware processor to execute operations comprising:
   generating, by the database system executing on a secure enclave, attestation information;
   transmitting the attestation information to a remote entity;
   obtaining, by the database system executing on the secure enclave, one or more encryption keys in response to the remote entity authenticating the attestation information; and
   performing, by the database system executing on the secure enclave, one or more database operations on encrypted data stored on the database system using the one or more encryption keys, an operating system of the secure enclave executing the database system being provided by a user of the database system, the user being associated with the encrypted data.

2. The system of claim 1, wherein the database system comprises a virtual warehouse.

3. The system of claim 1, wherein the attestation information is generated by keys derived from a hardware root and represents that a secure enclave is being used and is in a known good state.

4. The system of claim 1, the operations comprising:
   accessing one or more resource logs associated with the secure enclave;
   obtaining a key associated with the secure enclave; and
   encrypting the one or more resource logs using the obtained key to generate the attestation information.

5. The system of claim 1, wherein the remote entity comprises a third-party service relative to an entity that provides the database system.

6. The system of claim 5, wherein the remote entity accesses one or more authorization policies and authenticates the attestation information using the one or more authorization policies.

7. The system of claim 1, the operations comprising:
   receiving, from the remote entity, a token in response to the remote entity authenticating the attestation information;
   transmitting a request for the one or more keys to a key broker, the request comprising the token; and
   receiving the one or more keys from the key broker in response to the key broker successfully authenticating the token.

8. The system of claim 1, wherein the remote entity stores the one or more keys and provides the one or more keys to the database system in response to authenticating the attestation information.

9. The system of claim 1, wherein processes executed by the secure enclave are inaccessible to any resource external to the secure enclave.

10. The system of claim 1, wherein the operating system of the secure enclave executing the database system is open source.

11. The system of claim 1, wherein the user is associated with a client device that generates the one or more keys and provides the one or more keys to the remote entity or a key broker associated with the remote entity.

12. The system of claim 1, the operations comprising:
    generating a hash of the operating system being executed by the secure enclave; and transmitting the hash to a client device of the user to enable the client device to authenticate the operating system being executed by the secure enclave.

13. The system of claim 1, wherein the secure enclave comprises a trusted execution environment (TEE).

14. A method comprising:
generating, by one or more processors of a secure enclave executing a database system, attestation information;
transmitting the attestation information to a remote entity;
obtaining, by the database system executing on the secure enclave, one or more encryption keys in response to the remote entity authenticating the attestation information; and
performing, by the database system executing on the secure enclave, one or more database operations on encrypted data stored on the database system using the one or more encryption keys, an operating system of the secure enclave executing the database system being provided by a user of the database system, the user being associated with the encrypted data.

15. The method of claim 14, wherein the database system comprises a virtual warehouse.

16. The method of claim 14, wherein the attestation information is generated by keys derived from a hardware root and represents that a secure enclave is being used and is in a known good state.

17. The method of claim 14, comprising:
accessing one or more resource logs associated with the secure enclave;
obtaining a key associated with the secure enclave; and
encrypting the one or more resource logs using the obtained key to generate the attestation information.

18. The method of claim 14, wherein the remote entity comprises a third-party service relative to an entity that provides the database system.

19. The method of claim 18, wherein the remote entity accesses one or more authorization policies and authenticates the attestation information using the one or more authorization policies.

20. The method of claim 14, comprising:
receiving, from the remote entity, a token in response to the remote entity authenticating the attestation information;
transmitting a request for the one or more keys to a key broker, the request comprising the token; and
receiving the one or more keys from the key broker in response to the key broker successfully authenticating the token.

21. The method of claim 14, wherein the remote entity stores the one or more keys and provides the one or more keys to the database system in response to authenticating the attestation information.

22. The method of claim 14, wherein processes executed by the secure enclave are inaccessible to any resource external to the secure enclave.

23. The method of claim 14, wherein the operating system of the secure enclave executing the database system is open source.

24. A computer-storage medium comprising instructions that, when executed by at least one processor of a machine, configure the machine to perform operations comprising:
generating, by a database system executing on a secure enclave, attestation information;
transmitting the attestation information to a remote entity;
obtaining, by the database system executing on the secure enclave, one or more encryption keys in response to the remote entity authenticating the attestation information; and
performing, by the database system executing on the secure enclave, one or more database operations on encrypted data stored on the database system using the one or more encryption keys, an operating system of the secure enclave executing the database system being provided by a user of the database system, the user being associated with the encrypted data.

25. The computer-storage medium of claim 24, wherein the database system comprises a virtual warehouse.

26. The computer-storage medium of claim 24, wherein the attestation information is generated by keys derived from a hardware root and represents that a secure enclave is being used and is in a known good state.

27. The computer-storage medium of claim 24, the operations comprising:
accessing one or more resource logs associated with the secure enclave;
obtaining a key associated with the secure enclave; and
encrypting the one or more resource logs using the obtained key to generate the attestation information.

28. The computer-storage medium of claim 24, wherein the remote entity comprises a third-party service relative to an entity that provides the database system.

29. The computer-storage medium of claim 28, wherein the remote entity accesses one or more authorization policies and authenticates the attestation information using the one or more authorization policies.

\* \* \* \* \*